United States Patent [19]

Tanaami et al.

[11] Patent Number: 4,615,481
[45] Date of Patent: Oct. 7, 1986

[54] AIR CONDITIONER

[75] Inventors: Taichi Tanaami; Hiroshi Kogure, both of Sano; Masakatsu Hayashi, Shimizu, all of Japan

[73] Assignee: Hitachi, Ltd., Tokyo, Japan

[21] Appl. No.: 664,338

[22] Filed: Oct. 24, 1984

[30] Foreign Application Priority Data

Oct. 26, 1983 [JP] Japan ................. 58-199013

[51] Int. Cl.[4] ............................................. F24F 11/04
[52] U.S. Cl. ...................................... 236/38; 236/1 B; 165/40
[58] Field of Search ................. 236/49, 1 B, 93 R, 38; 165/16, 40; 62/186; 98/40.25

[56] References Cited

U.S. PATENT DOCUMENTS

| 2,117,529 | 5/1938 | Wile et al. | 236/49 X |
| 3,656,541 | 4/1972 | Coyle et al. | 165/16 |
| 3,917,161 | 11/1975 | Nielsen | 236/49 X |
| 4,326,452 | 4/1982 | Nawa et al. | 98/40.25 |

*Primary Examiner*—Harry Tanner
*Attorney, Agent, or Firm*—Antonelli, Terry & Wands

[57] ABSTRACT

An air conditioner comprising temperature detectors for respectively detecting air temperatures at suction and discharge sides, a fan motor whose rotational speed is controllable, a motor driven wind directing plate, and a control section for controlling the discharge angle by the wind directing plate and for controlling the air flow amount by the fan motor. Thus, the air flow amount and the discharge angle are controlled by the control section to heat a room such that the heating operation is effected with a small amount of warmed air of a high temperature immediately after the start of operation, and the amount of warmed air is gradually increased and the discharge angle is also gradually changed as the room temperature rises.

4 Claims, 7 Drawing Figures

AIR CONDITIONER

BACKGROUND OF THE INVENTION

The present invention generally relates to air conditioners and, more particularly, to an air conditioner which is improved in comfort in heating operations.

An object of the present invention is to provide an air conditioner which enables comfortable heating without requiring troublesome operations from the starting of operation of the air conditioner.

In order to attain the above object, according to the present invention, a fan motor and a wind directing plate of the air conditioner are controlled in the interlinked state such that the floor surface is warmed with air of a high temperature with a small amount immediately after the starting of operation, and then the air amount is gradually steplessly increased and the wind is also gradually steplessly directed upwards as the room temperature rises to thereby increase the heating region in the dwelling space.

Above and other objects, features, and advantages will be apparent when read the following detailed description in conjunction with the accompanying drawings.

DETAILED DESCRIPTION

Figure 1:
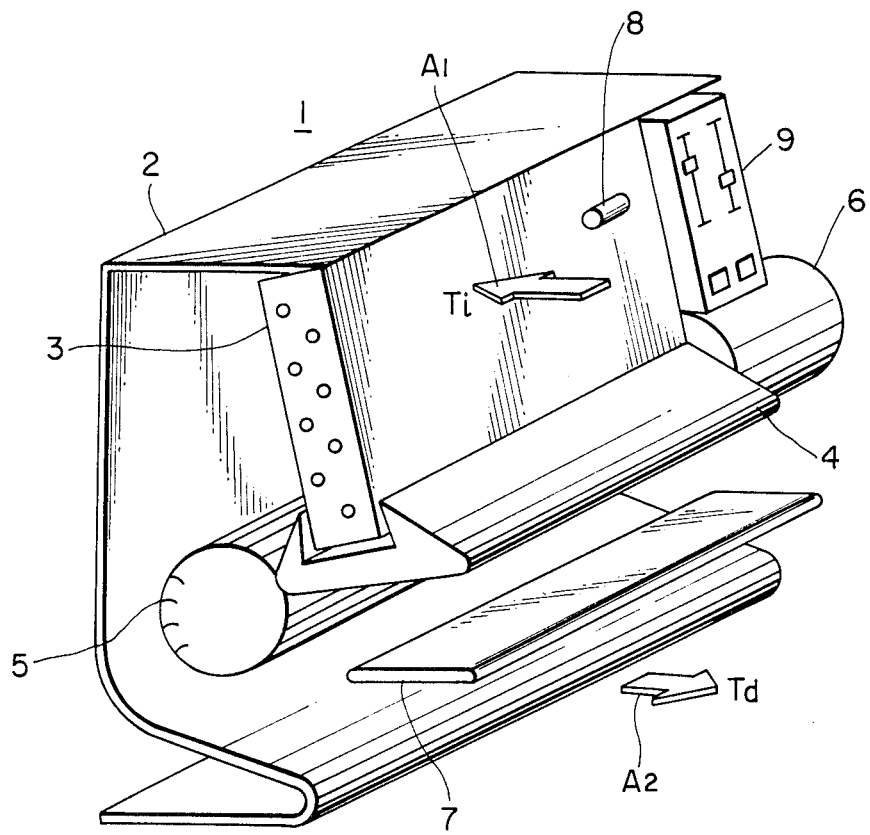
FIG. 1 is a perspective view of a conventional air conditioner.
Figure 2:
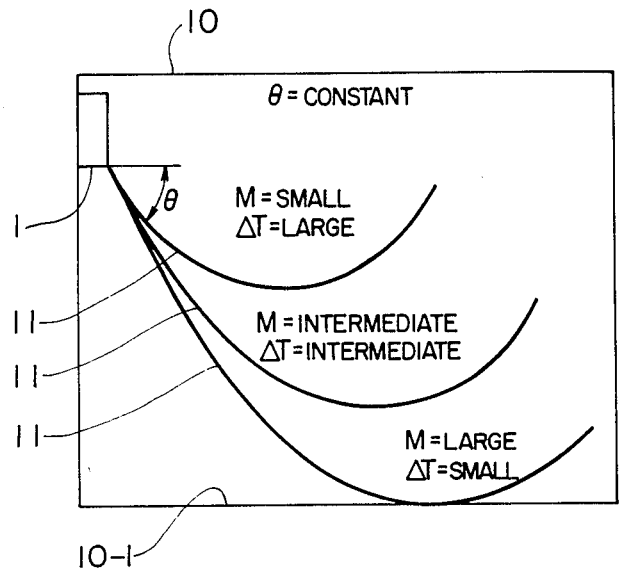
FIGS. 2 and 3 are graphical illustrations of stream lines of the discharged warm air in heating operations.
Figure 3:
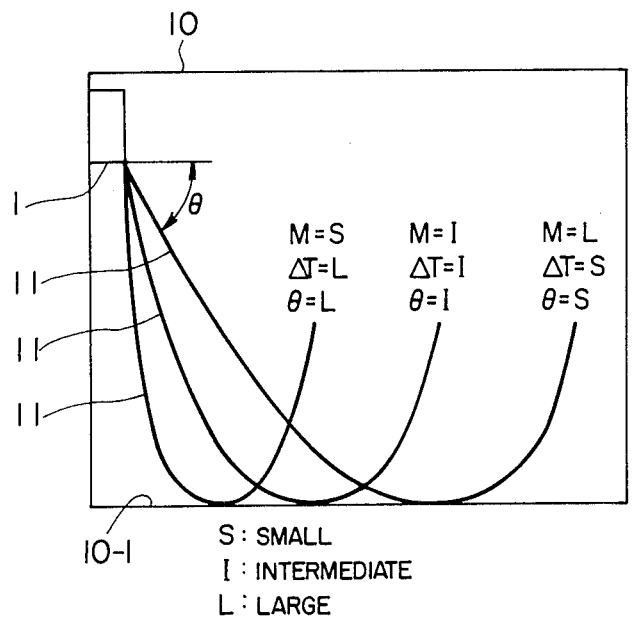

Referring now to the drawings wherein like reference numerals are used throughout the various views to designate like parts and, more particularly, to FIG. 1, according to this figure, a conventional air conditioner includes an indoor unit 1 connected with an outdoor unit (not shown) of the air conditioner through a coolant pipe, and a base member 2 on which constitutent parts are supported. A heat exchanger 3 is provided for effecting heat exchanging with the indoor temperature to perform a cooling or heating operation, with a fan casing 4 serving as a drip pan for the heat exchanger 3. A fan 5 causes a flowing of air cooled or warmed by the heat exchanger 3 into the room, with a fan motor 6 being provided for rotating the fan 5, and with the amount of air flow being determined in dependence upon the magnitude or size of the output of the fan motor 6. A wind directing plate 7 is manually angularly variable adjustable in about three stages such that the angle of discharging cooled/warmed air is adjusted by the wind directing plate 7. The heat exchanger 3, drip pan 4, the fan 5, the fan motor 6, and the wind directing plate 7 are fixedly supported on the base member 2. A sensor 8 detects a temperature $T_i$ of suction air, which is equal to a room temperature, and produces an output signal which is applied to a thermostat (not shown) to thereby turn a compressor, mounted in a condensing unit at an outdoor side, on/off thereby maintaining the indoor temperature constant. A control section 9 controls the on/off operation of a power source, the output adjustment of the fan motor 6, etc. The arrows $A_1$, $A_2$ respectively indicate the directions of suction and discharge air flow. FIGS. 2 and 3 illustrate streamlines of discharge air in the heating operation by the above-described compressor with, for example, a rated heating capacity of 3150 Kcal/h.

FIG. 2 provides an example of three states of discharge air streams when the amount of air flow M is varied amount three levels, that is, a large, middle, and small level, with a blowing angle $\theta$ being maintained constant; whereas, FIG. 3 provides an example of an illustration of three states of discharge air streams in a situation wherein the amount of air flow M is varied among three levels, that is, large, middle, and small levels, with a blowing angle of $\theta$ being variable.

In FIGS. 2 and 3, a vertically sectioned frame of a room at the center thereof is designated by the reference numeral 10, with a floor surface being represented by the reference numeral 10-1 and with curves 11 illustrating discharged air streams. The amount of air flow M is varied in accordance with the magnitude of the output of the fan motor 6 shown in FIG. 1. The discharge air angle $\theta$ is varied by moving the wind directing plate 7. A temperature difference $\Delta T$ between the suction air temperature $T_i$ and discharge air temperature $T_d$ becomes smaller as the room temperature rises.

Accordingly, if the temperature difference $\Delta T$ is large when the discharge angle $\theta$ is fixed while the air flow amount M is small, as shown in FIG. 2, the warmed air rises before it reaches the floor surface 10-1. In order to prevent this phenomenon when the temperature difference is large, the discharge angle $\theta$ is enlarged and the air flow amount M is reduced, as shown in FIG. 3, so that the warmed air is forced to reach the floor surface 10-1. Thus, in order to make the floor surface comfortable from the starting of the air conditioner, it is necessary to set the discharge angle $\theta$ to a value which is sufficient to overcome the temperature difference $\Delta T$.

However, with a conventional air conditioner unit such as described above, since the temperature, the air flow amount M, and the discharge angle $\theta$ are controlled independently of each other, it is troublesome to set the temperature, the air flow amount M, and the discharge angle $\theta$ to optimum values to attain the best condition of comfort.

Furthermore, as shown in FIG. 3, the suction temperature $T_i$ is low at the start of operation and comfortable heating from the floor surface can be obtained by adjusting the air flow amount M to be small and the discharge angle $\theta$ to be large; however, a disadvantage of this approach resides in the fact that, in the case where the change-over of the air flow amount M and the discharge angle $\theta$ are manually performed in the convention system, even if the air flow amount M and discharge angle $\theta$ are intially properly set, the temperature difference $\Delta T$ with respect to the initial setting values becomes larger before the initial setting values are reset so that the warmed air current rises before it reaches the floor surface and, consequently, comfortable heating cannot be attained.

Figure 4:
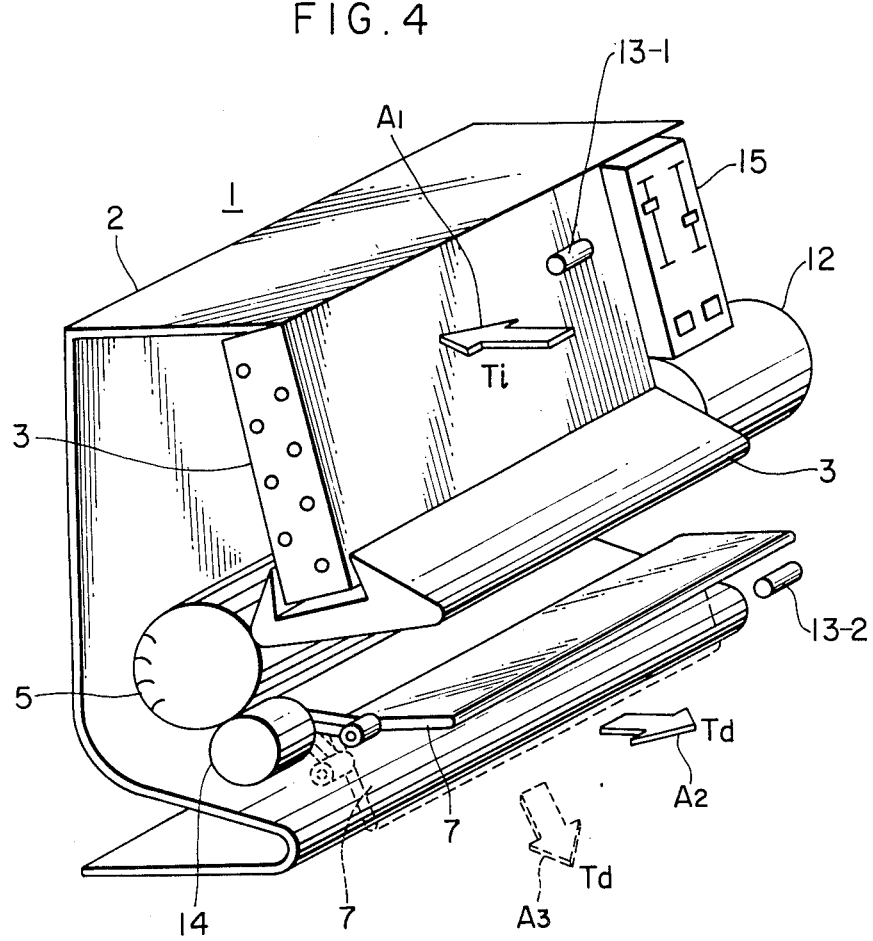
FIG. 4 is a perspective view of an embodiment of the air conditioner according to the present invention.

In accordance with the present invention, as shown in FIG. 4, the air conditioner according to the present invention includes a variable speed fan motor 12 which may be, for example, a three-phase induction motor the rotational speed of which is varied through an invertor incorporated in the motor. Numerals and sensors 13-1, 13-2 respectively detect the suction and discharge air temperatures of the air conditioner. A motor 14 changing the angle of a wind directing plate 7. The angle of wind directing plate 7 is varied by the motor 14 from the direction of arrow $A_2$ to the direction $A_3$ as shown by a broken line in the drawing.

Figure 5:
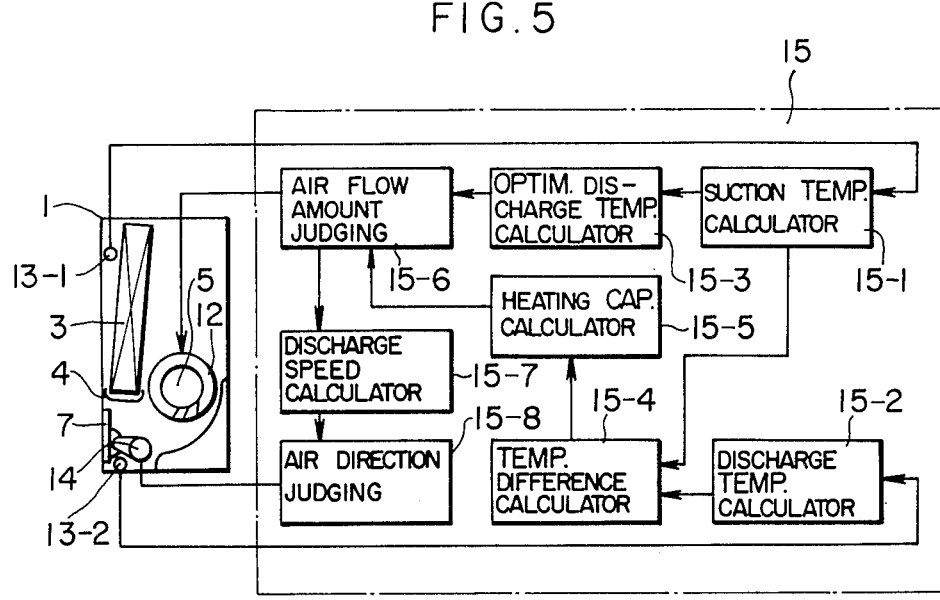
FIG. 5 is a block diagram of an embodiment of the control section according to the present invention.

As shown in FIG. 5, a control section 15 includes a suction temperature calculator section 15-1 calculates the suction temperature in accordance of the output of the suction temperature sensor 13-1. The output of the suction temperature calculator section 15-1 is applied to an optimum discharge temperature calculator section 15-3 and a temperature difference calculator section 15-4. The output of a discharge temperature calculator section 15-2 is also applied to the temperature difference calculator section 15-4 as another input thereof. The discharge temperature calculator section 15-2 calculates the discharge temperature $T_d$ in accordance with the output of the discharge temperature sensor 13-2. The output of the temperature difference calculator section 15-4 is applied to a heating ability calculator section 15-5 in which the heating capacity Q is calculated in accordance with the following equation by using the temperature difference $\Delta T$ calculated in the temperature difference calculator section 15-4:

$$Q = 60 M \Delta T \cdot K$$

where M represents the air flow amount in the operation with the lowest fan velocity. The value of K is a constant determined with weight (kg/m$^3$) and specific heat (kcal/kg°C.).

The respective outputs of the optimum discharge temperature calculator section 15-3 and the heating ability calculator section 15-5 are applied to an air flow amount increase/decrease judging section 15-6 in which the air flow amount M is calculated on the basis of the discharge temperature $T_d$ and the heating capacity Q. The output of the air flow amount increase/decrease judging section 15-6 is applied to a discharge speed calculator section 15-7 in which the discharge speed is calculated. The output of the discharge speed calculator section 15-7 is applied to a wind direction change judging section 15-8 which controls the motor 14 in accordance with the discharge speed and sets the angle of the wind directing plate 7.

Figure 6:
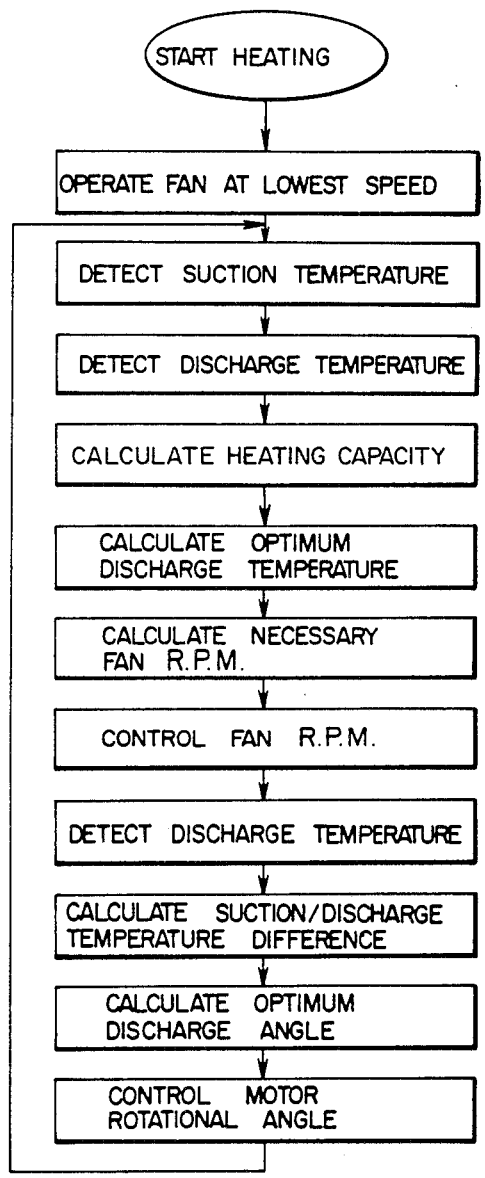
FIG. 6 is a flowchart of steps from start to end of the heating operation.

On the basis of the outputs of the respective sensors 13-1 and 13-2, the control section 15 instructs the air conditioner to perform the operations as shown in the flowchart of FIG. 6.

Figure 7:
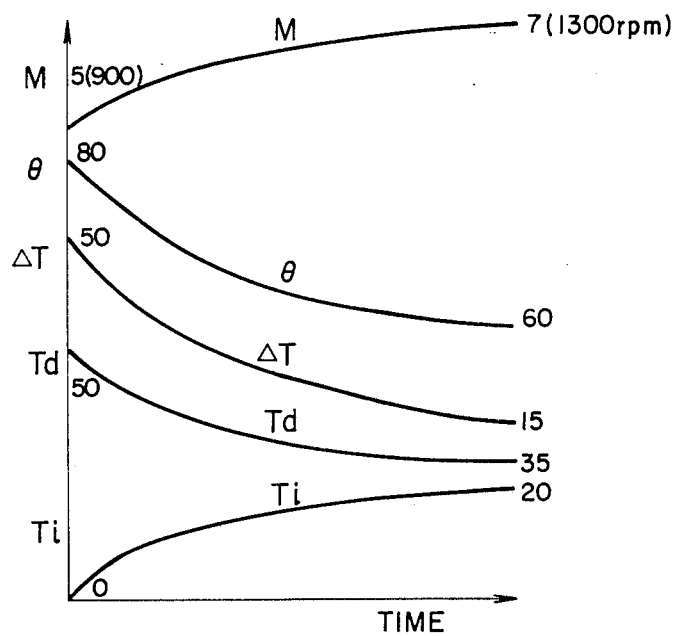
FIG. 7 is a graphical illustration of an example of the optimum condition of the amount of air and the angle of wind direction from start to end of the heating operation.

FIG. 7 is a diagram showing changes in the suction temperature $T_i$, the discharge temperature $T_d$, the temperature difference $\Delta T$, the discharge angle $\theta$, and the air flow amount M, with the abscissa representing the time from the start of heating operation to the stable operating condition of the air conditioner and the ordinate representing the respective values discharge temperature $T_d$, the temperature difference $\Delta T$, the discharge angle $\theta$, and the air flow amount M.

In the drawing, the suction temperature $T_i$ is zero at the start of operation. At this time if the discharge temperature $T_d$ takes the maximum value of about 50° C., the temperature difference $\Delta T$ is the maximum (about 50° C.) and, therefore, it becomes possible to perform heating from the floor surface by making the blast amount minimum (the rotational speed of the motor is about 900 r.p.m.) with the discharge angle $\theta$ of about 80°. Continuing the operation, the suction temperature $T_i$ reaches the stable state of about 20° C. At this time the respective values of the discharge temperature $T_d$ and the discharge angle become about 35° C. and about 60°, and the rotational speed of the fan motor, which determines the air flow, becomes the largest value of 1,300 r.p.m.

As described above, according to the present invention, the air flow amount M and the discharge angle $\theta$ are automatically adjusted by the control section of the air conditioner without troubling the user for the adjustment of the air flow amount M and the discharge angle $\theta$. Further, since the air flow amount M and the discharge angle $\theta$ are steplessly controlled, the air flow amount M increases in proportion to the temperature difference $\Delta T$. Thus, the air flow amount M sufficient to always overcome the increase in the temperature difference $\Delta T$ can be obtained steplessly and the phenomenon that the warmed air current rises before it reaches the floor surface is prevented from occurring.

The present invention is applied not only to the heating operation but to the cooling operation with the same effects as in the heating operation.

We claim:

1. An air conditioner comprising:
a first and second temperature detecting means respectively provided at an air suction side and an air discharging side;
a first electric motor for angularly adjusting a wind directing plate;
a second electric motor for controlling a rotational speed of a blower fan;
a control section provided between said first and second temperature detecting means and said first and second motors for simultaneously controlling the outputs of said first and second motors, in which said control section controls the output of the first motor on the basis of the respective outputs of said first and second temperature detecting means to thereby angularly adjust said wind directing plate and control the rotational speed of said second motor.

2. An air conditioner according to claim 1, in which said control section comprises:
a first means responsive to the output of said first temperature detecting means for calculating a temperature at the suction side in accordance with said output of said first temperature detecting means;
a second means responsive to the output of said second temperature detecting means for calculating a temperature at the discharge side in accordance with said output of said second temperature detecting means;
a third means responsive to the respective outputs of said first and second means for calculating a temperature difference between said respective outputs in accordance with said respective outputs;
a fourth means responsive to the output of said third means for calculating a heating capacity in accordance with the output of said third means;
a fifth means responsive to the output of said first means for calculating an optimum discharge temperature in accordance with the output of said first means;
a sixth means responsive to the respective outputs of said fourth and fifth means for calculating an air flow amount in accordance with the respective outputs of said fourth and fifth means;

a seventh means responsive to the output of said sixth means for calculating a discharge speed in accordance with the output of said sixth means;

a eighth means responsive to the output of said seventh means for calculating a discharge direction in accordance with the output of said seventh means;

said second motor being controlled in accordance with the output of said sixth means; and said first motor being controlled in accordance with said eighth means.

3. An air conditioner comprising:

a first temperature sensing means provided at an air suction side of the air conditioner for detecting temperature of the suction air;

a second temperature sensing means provided at an air discharging side of said air conditioner for detecting temperature of the discharge air;

a first electric motor means for moving a wind directing plate so as to vary a wind direction of the discharge air in accordance with an output thereof;

a second electric motor means for driving a blower fan according to an output thereof; and control means provided between said first and second temperature sensing means and said first and second motor means for simultaneously controlling both of the outputs of said first and second motor means corresponding to a temperature differential detected by said first and second temperature sensing means.

4. An air conditioner according to claim 3, wherein said control means includes means for calculating a heating capacity in dependence upon the temperature differential, and control said first and second motor means in correspondence to the heating capacity.

* * * * *